(12) United States Patent
Schmitz

(10) Patent No.: US 8,354,932 B2
(45) Date of Patent: Jan. 15, 2013

(54) METHOD AND DEVICE FOR DRIVER ASSISTANCE

(75) Inventor: Carsten Schmitz, Wasserburg (DE)

(73) Assignee: Robert Bosch GmbH, Stuttgart (DE)

( * ) Notice: Subject to any disclaimer, the term of this patent is extended or adjusted under 35 U.S.C. 154(b) by 779 days.

(21) Appl. No.: 11/664,573

(22) PCT Filed: Aug. 17, 2005

(86) PCT No.: PCT/EP2005/054049
§ 371 (c)(1),
(2), (4) Date: Feb. 27, 2008

(87) PCT Pub. No.: WO2006/037687
PCT Pub. Date: Apr. 13, 2006

(65) Prior Publication Data
US 2008/0258884 A1    Oct. 23, 2008

(30) Foreign Application Priority Data
Oct. 1, 2004  (DE) .......................... 10 2004 048 013

(51) Int. Cl.
*G08B 23/00*    (2006.01)
(52) U.S. Cl. ...................... 340/576; 340/425.5; 340/435; 340/436; 340/437; 340/438; 340/901; 340/903; 180/167; 180/168; 180/169; 180/204; 701/72; 701/116; 701/122
(58) Field of Classification Search .................. 340/576, 340/425.5, 435–438, 903, 901, 908.1; 701/72, 701/93, 98, 45, 116, 210, 27, 122, 300–302; 180/167, 188, 169, 168, 204
See application file for complete search history.

(56) References Cited

U.S. PATENT DOCUMENTS

| 5,432,509 | A  | * | 7/1995  | Kajiwara ....................... 340/903 |
| 6,339,740 | B1 | * | 1/2002  | Seto et al. ....................... 701/96 |
| 6,590,495 | B1 |   | 7/2003  | Behbehani |
| 6,748,302 | B2 | * | 6/2004  | Kawazoe .......................... 701/1 |
| 6,826,469 | B2 | * | 11/2004 | Iwata et al. ..................... 701/93 |
| 2002/0095246 | A1 | * | 7/2002 | Kawazoe ............................. 701/1 |
| 2003/0173127 | A1 | * | 9/2003 | Noecker ....................... 180/167 |
| 2004/0143381 | A1 | * | 7/2004 | Regensburger et al. ........ 701/36 |

FOREIGN PATENT DOCUMENTS

| DE | 42 00 694    | 7/1993  |
| DE | 196 47 283   | 5/1997  |
| DE | 196 37 053   | 4/1998  |
| DE | 103 03 578   | 8/2004  |
| EP | 0 549 909    | 7/1993  |
| EP | 0 716 949    | 6/1996  |
| EP | 1 074 430    | 2/2001  |
| FR | 2 071 418    | 9/1971  |
| JP | 2004-171497  | 10/1994 |
| JP | 7-65296      | 3/1995  |
| JP | 9-188234     | 7/1997  |
| JP | 11-34773     | 2/1999  |
| JP | 2001-310719  | 11/2001 |

(Continued)

Primary Examiner — George Bugg
Assistant Examiner — Sisay Yacob
(74) Attorney, Agent, or Firm — Kenyon & Kenyon LLP

(57) ABSTRACT

A method and a device for driver assistance in which the warning threshold at which the driver is warned for example of a departure from the lane is adaptively adjusted as a function of the driver's state and/or the driving situation.

10 Claims, 4 Drawing Sheets

FOREIGN PATENT DOCUMENTS

| | | |
|---|---|---|
| JP | 2002-109694 | 4/2002 |
| JP | 2003-104185 | 4/2003 |
| JP | 2003-337998 | 11/2003 |
| JP | 2004-38641 | 2/2004 |
| JP | 2004-38858 | 2/2004 |
| JP | 2004-178159 | 6/2004 |
| WO | WO 96/14591 | 5/1996 |

\* cited by examiner

METHOD AND DEVICE FOR DRIVER ASSISTANCE

FIELD OF THE INVENTION

The present invention relates to a method and a device for driver assistance, in particular for warning the driver or laterally guiding the vehicle if the vehicle has left its lane or threatens to leave its lane.

BACKGROUND INFORMATION

Warning systems that warn the driver upon departure from the lane or threatened departure from the lane are known in the prior art. For example, European Patent Application No. EP 1074430 indicates a procedure in which, on the basis of an image sensor system, the lane on which a vehicle is moving is determined and the driver is warned if the vehicle is leaving this lane or threatens to leave this lane. The precise boundary conditions under which such a warning takes place are not indicated. In particular, the respective driving situation is not taken into account, so that false warnings can occur, which is unpleasant for the driver.

From German Patent Application No. DE 196 37 053, it is known to use an angle-resolving distance and speed sensor, preferably a radar or laser sensor, to recognize objects on an adjacent lane, and to determine the direction of travel of these objects on the basis of their relative speed.

SUMMARY OF THE INVENTION

By setting the warning, preferably a warning threshold or the time of the warning, as a function of the state of the driver and/or the driving situation, it is possible to significantly reduce the rate of false alarms, in particular upon departure from a lane, without a loss of safety. The acceptance of the driver assistance system is thereby advantageously improved.

Advantageously, the expansion of the functionality does not result in any additional costs, because in systems that operate solely on the basis of object recognition using a video camera no additional hardware is necessary. Advantageously, additional functions that are used in today's motor vehicles, for example object recognition systems using radar sensors, can be used to expand the functionality, so that here as well additional costs due to additional hardware do not arise.

In a particularly advantageous manner, the warning threshold is expanded if the driver is attentive, so that false warnings can be minimized, while the warning threshold is narrowed in order to minimize dangerous situations if the driver is not attentive. Here, expansion of the warning threshold means that a warning takes place closer to the edge marking, or even after the edge marking has been crossed, and narrowed means that the warning takes place at a significantly greater distance from the marking.

In addition, the time of the warning or the warning threshold is advantageously adapted to the driving situation. In particular, here the time of the warning or the warning threshold is predetermined separately for the individual sides; for example, given an open shoulder to the right the warning time is pushed back far enough that no warning takes place even after the vehicle has departed from the lane in the direction of the shoulder. This also significantly reduces false alarms. In a different situation, in which for example on a rural road no lane is present at the right, warnings are completely eliminated on the right side (switching off of the warning function or expansion of the warning threshold to limits that cannot be reached), which also reduces the rate of false alarms. This is done because in this driving situation warnings due to departure from the lane do not make sense.

DETAILED DESCRIPTION

Figure 1:
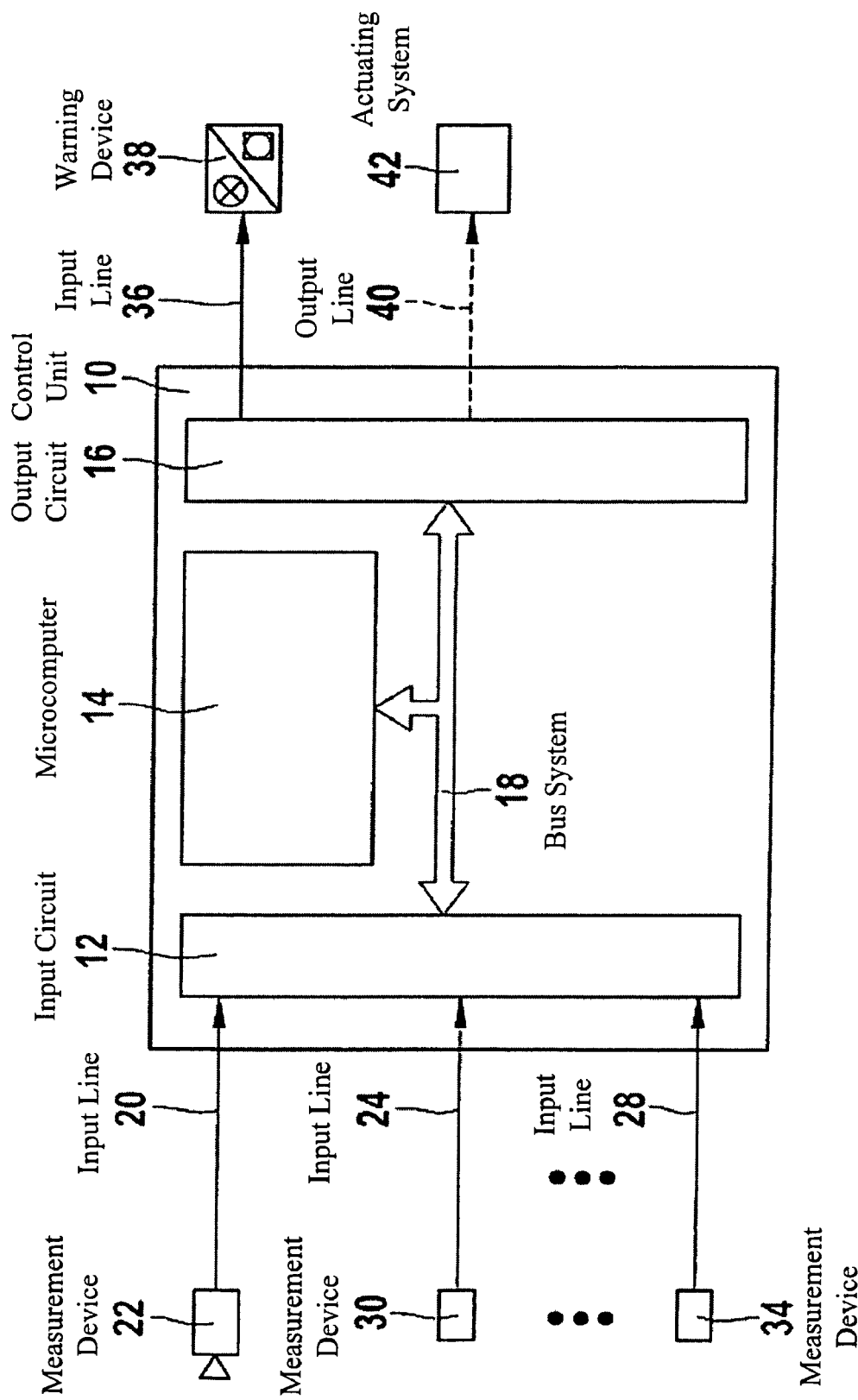
FIG. 1 shows a block diagram of a device for warning the driver or for reacting to a threatened vehicle departure from the lane.

FIG. 1 shows a device that is used to warn the driver or to react in the case of future departure of the vehicle from the lane. A control or evaluation unit 10 is shown that has an input circuit 12, a microcomputer 14, and an output circuit 16. These elements are connected to one another via a bus system 18 for mutual data exchange. Input circuit 12 is supplied with input lines from various measurement devices, via which measurement signals or measurement information is transmitted. A first input line 20 connects input circuit 12 to an image sensor system 22 that records the scene in front of the vehicle. Corresponding image data are transmitted via input line 20. In addition, input lines 24 to 28 are provided that connect input circuit 12 to measurement devices 30 to 34. These measurement devices are for example measurement devices for measuring vehicle speed, for acquiring steering angle or yaw rate, and for acquiring additional operating quantities of the vehicle that are significant in connection with the procedure described below. Via output circuit 16 and input line 36, at least one warning device 38 is controlled, for example a warning lamp and/or a loudspeaker for an acoustic warning or for a speech output, and/or a display device for displaying an image with the aid of which the driver is informed or warned of the threatened departure from the lane as determined by the procedure presented below. In addition, or alternatively, in some exemplary embodiments it is provided to control, via output circuit 16 and an output line 40, an actuating system 42 that automatically guides the vehicle back into the lane, for example by intervening in the vehicle steering system, thus preventing departure from the lane.

In the preferred exemplary embodiment, the recognition of the lane markings takes place using an image sensor system, preferably a camera system. Through analysis of the recorded images, in particular on the basis of the gray scale distribution, an image evaluation unit recognizes edge markings whose curve is determined as a mathematical function. In an embodiment, the image sensor system is also used to observe objects in the vicinity of the lane of the vehicle, as well as on adjacent lanes (to the left or to the right). Here, as above, standard object recognition methods are used. On the basis of successive recorded exposures and the vehicle's own speed, on the basis of this information it can be determined whether a recognized object on an adjacent lane is traveling in the same direction of travel or in the opposite direction of travel. In this way, the driving situation (type of marking and/or type of adjacent lane and/or traffic situation) can be acquired. Instead of the image sensor system, in other embodiments other sensors are used to acquire the driving situation, for example radar sensors, laser sensors, etc. In addition, in other embodiments sensors are present that recognize objects around the vehicle and determine the distances to these objects. In these cases, not only the direction of travel on an adjacent lane can be determined; rather, the actual presence of vehicles and their direction of motion on the adjacent lane can be recognized.

On the basis of the information concerning at least one lane edge marking whose curve is represented as a mathematical function, as well as the future trajectory of the home vehicle, determined for example on the basis of steering angle, etc., in the case of a calculated intersection or impermissible nearing of these two functions an expected departure from the lane is determined. If this is the case, and if a driving situation is present in which an increased potential for danger is to be assumed if the vehicle leaves the lane, a warning is outputted to the driver acoustically and/or optically and/or haptically, or a correction of the trajectory of the vehicle is undertaken through a targeted intervention in the trajectory of the vehicle, for example a steering intervention.

As described above, from the image of at least one camera the curve of the roadway edge markings is determined. On the basis of the trajectory of the vehicle, for both sides of the vehicle points of intersection that may be present between the vehicle trajectory and the curve of the roadway marking are determined mathematically. Taking into account additional operating quantities, for example vehicle speed, a warning time is determined. This is present either in the form of a lateral distance from the roadway marking—e.g., a warning takes place precisely at the moment when the distance becomes smaller than a determined value, e.g. 20 cm—or else through a time value, known as the TTL value (Time To Line crossing). In the latter case, the warning takes place precisely at the moment when this time value becomes smaller than, for example, 0.02 seconds. This value indicates the time span that the vehicle requires under the current conditions to cross the roadway marking. This warning threshold (warning time) is, as described above, adapted to the state of the driver and the driving situation.

For the recognition of the driving situation, on the one hand the camera is provided, and on the other hand, in an embodiment, additional driving situation recognition sensors, for example radar sensors, are provided. This driving situation recognition system supplies information concerning the presence of adjacent lanes, and in particular concerning the presence of foreign objects, for example vehicles, in these lanes. As a function of this information, the warning thresholds, or the warning times, are changed, in particular delayed, without a loss of safety of the system. The false alarm rate is reduced.

Figure 2:
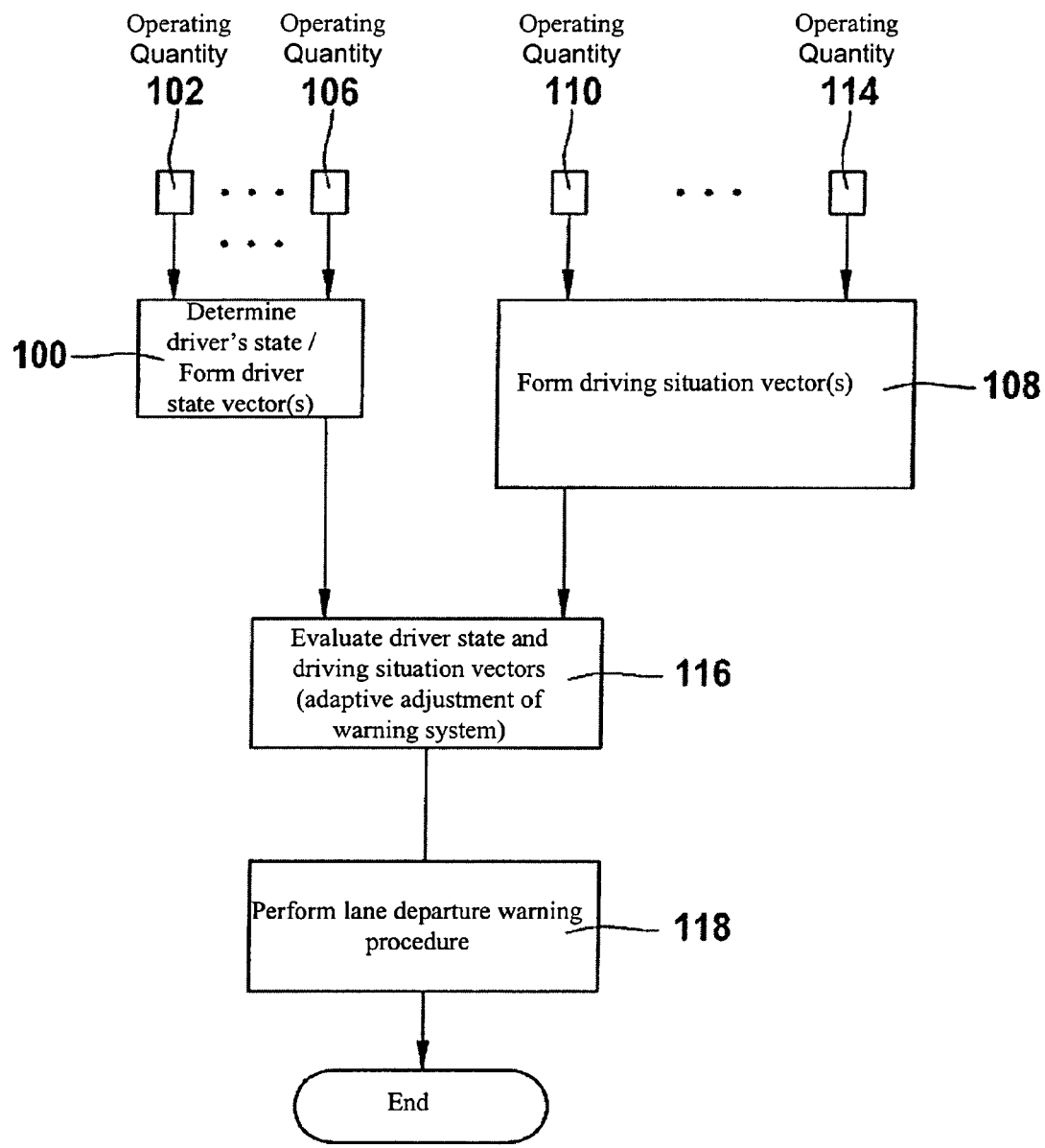
FIG. 2 shows a flow diagram in which the adaptive setting of the warning, as a function of the driver state and/or as a function of the driving situation, is presented in the context of a preferred specific embodiment.

In the preferred specific embodiment, the above-described procedure is realized as a computer program of computer 14 of control unit 10. FIG. 2 shows a flow diagram that sketches such a computer program. The basic idea is that both for the driver's state and for the driving situation, or for only one of these two quantities, a value vector is determined that is evaluated for the adaptive adjustment of the warning (warning threshold, warning time) of the lane departure warning device. Here, the driver's state is essentially formed through the features: attentiveness (i.e., is the driver directed to the driving task), fatigue, and driving style. The driver's state is, in 100, determined as a function of various supplied operating quantities 102 to 106. For example, on the basis of an observation of the position of the driver's body, or by scanning operating elements and their state of actuation, it is determined whether the driver has focused his attention on the driving task or whether he is, for example, operating a radio. In addition, as a function of gas pedal values, steering values, etc., a fatigue value for the driver is determined. An example of implementing the determination of such a value is the PERCLOS algorithm, which indicates driver fatigue relatively precisely. The driving style of the driver is determined for example by evaluating gas pedal actuation, brake actuation, vehicle acceleration, and changes in these parameters, a defensive driving style being assumed in the case of small changes and an aggressive driving style being assumed in the case of very large changes, etc. In another exemplary embodiment, the degree of attentiveness of the driver can be determined by making available the operation of radio, cell phone, or navigation systems on the vehicle's CAN bus (known as hands-on detection).

In 108, a driving situation vector, i.e. values for a description of the driving situation, is formed. This also takes into account supplied operating quantities relating to the driving situation (from 110 to 114). In the driving situation, above all the information concerning the roadway (e.g., rural road or highway) is of interest. The information as to whether the vehicle is situated on a rural road or a highway is preferably determined by a navigation system or by evaluating the image from the video camera, the conclusion as to whether a rural road or highway is present being made on the basis of the number of lanes and/or the radii of curvature of the lane. In addition, information concerning the presence of adjacent lanes is part of the description of the driving situation. Depending on the embodiment, the presence of adjacent lanes is realized by the image processing unit that is used for lane recognition in the lane departure warning device (see above). Another possibility is to use navigation data. A third component for describing the driving situation is an item of information concerning the presence of other vehicles in adjacent lanes. This information is preferably supplied by distance sensors, in particular radar sensors, which are used in a known manner in the adaptive speed controller or in blind spot detection. The radar sensors thus determine, on the basis of the reflections, whether objects are situated in front of or behind or next to the vehicle. Through corresponding angular resolution, these objects are also assigned to adjacent lanes, so that in this way information concerning vehicles in adjacent lanes is determined.

The vectors determined in the manner sketched above, relating to the driver's state and the driving situation, are evaluated in 116 for the adaptive adjustment of the warning system, preferably of the warning time, in particular the "time to line crossing" and/or the lateral distance (combined hereinafter under the term "warning time"), a warning taking place when this time is undershot. In the preferred exemplary embodiment, an allocation between the value of the warning time and the magnitude of the individual vectors is stored. After the adaptive adjustment of the warning time in 116, in 118 the lane departure warning is carried out by comparing the trajectory of the vehicle, as well as the determined roadway edge markings, taking into account the set warning time, and, if the warning time is undershot, the driver is warned optically, acoustically, or haptically, or a driving intervention is initiated in order to hold the vehicle in the lane.

In a preferred realization of the adaptive setting of the warning time, in the depicted exemplary embodiment a warning time is predetermined, by two factors each having three values, for each possible combination. In other exemplary embodiments, the setting of the warning time is calculated from the vector data. In addition, with the use of only one vector (driver's state or driver situation vector), the corresponding options for realization are present.

The setting of the warning thresholds or warning times essentially takes place as follows. With respect to the driver's state, a warning threshold is expanded, i.e. moved in the direction of smaller values (distance, time), in order to minimize false warnings of the system when the driver is alert and attentive. However, if the driver is sleepy and/or inattentive, the warning threshold is narrowed in order to minimize the dangerous situation. The driving style enters into the adaptive setting of the warning time in such a way that, given an aggressive, offensive, or "sports-like" driving style, the warning time is expanded in comparison to the warning time for a defensive, relaxed driving style, i.e., is moved in the direction of smaller values (distance, time) in order not to ask the "sports-like" driver to put up with unnecessary false warnings.

With respect to the driving situation, in the preferred exemplary embodiment it is provided that, if travel on a highway is recognized and there is an open shoulder to the right (no foreign objects), the warning time on the right side can be expanded far enough that it lies significantly after departure from the lane. In this situation, the driver can make a corrective steering back before the departure from the adjacent lane (in this case, the shoulder). In this way as well, the number of false alarms is significantly reduced. In a corresponding manner, in an embodiment in the case of departure from the left lane the warning threshold (or warning time) is placed significantly after the actual departure from the lane, if it has been ensured that at the left there is an additional lane and that no vehicles are situated in the corresponding lane. The situation is different on a rural road in which there is no lane on the right side (trench, alley, or the like). In such a situation, it is to be assumed that, if the driver is inattentive, a warning cannot take place in time if the vehicle departs the lane rightward. Therefore, there is no point in outputting a warning. In other words, in this case the warning function for the right side is switched off, or the warning time is expanded far enough that it cannot be reached. In this way, here the false alarm rate is reduced to zero.

For leftward departure from the lane, in an embodiment the procedure is the same as in the highway situation. If there is a lane and if there are foreign objects situated in the lane, the warning time is narrowed, while in the presence of a lane without foreign objects the warning time is expanded. In this situation, the warning time can be significantly after the actual departure from the lane.

If the warning time is set dependent both on the driver's state and also on the driving situation, then in any case the driver's state is dominant. That is, if the driver is sleepy and/or inattentive, the warning threshold is narrowed even if adjacent lanes are present on which there are no foreign objects.

Figure 3:
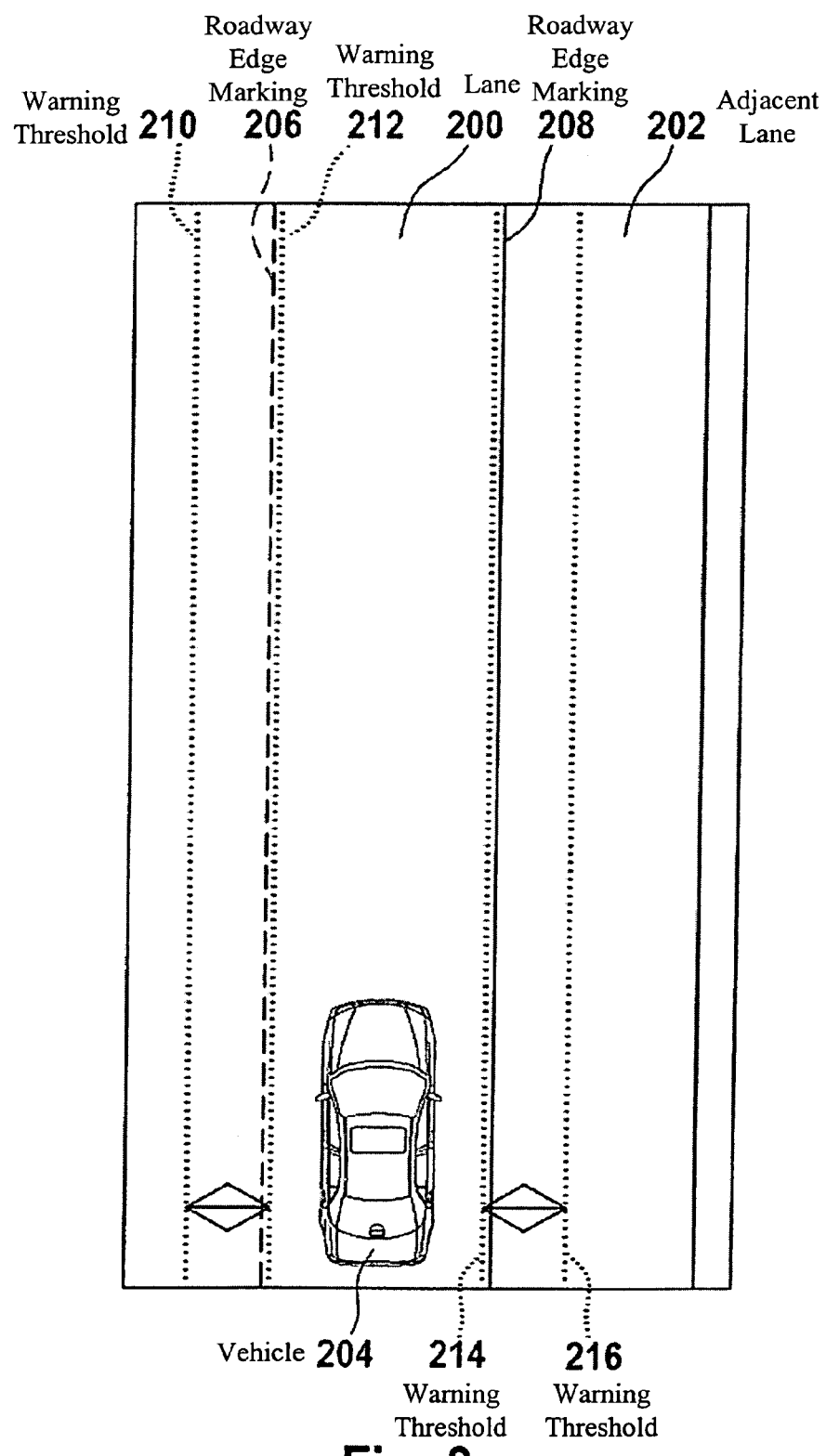
FIGS. 3 and 4 show typical driving situations for illustrating the manner of operation of the adaptive adjustment of the warning.

FIG. 3 shows a driving lane 200 with an adjacent lane 202. Vehicle 204 is moving on lane 200. The warning thresholds (here, lateral distance to roadway edge markings 206 or 208) are represented by dotted lines 210, 212 on the left side and 214 and 216 on the right side. The limits within which the warning time can be adaptively adjusted are indicated. The dotted line at the left of each roadway edge markings (212, 214) represents a narrowed warning time, while the boundaries situated farther from the vehicle (210, 216) represent expanded warning thresholds.

Figure 4:
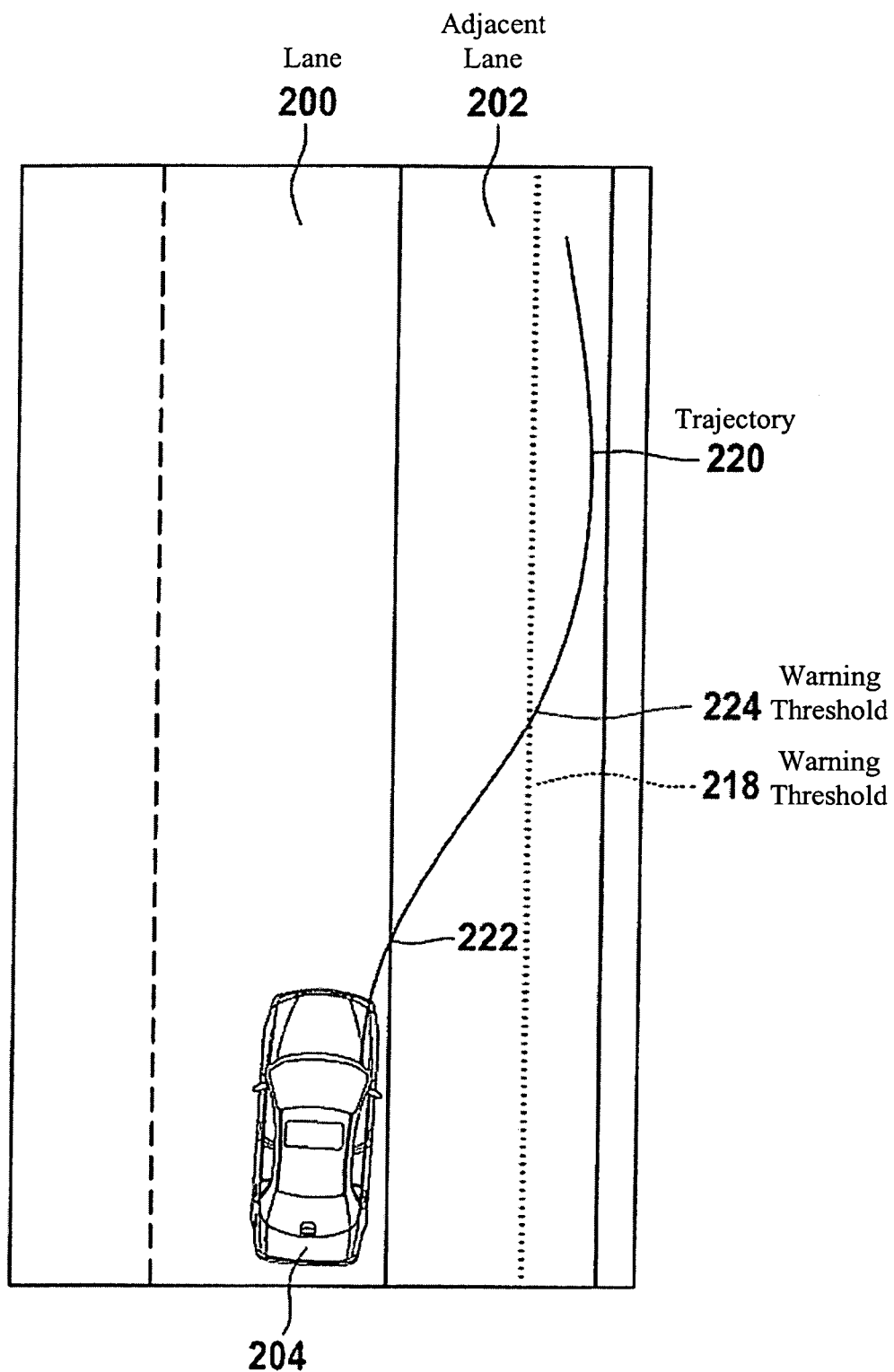

FIG. 4 shows a driving situation described above. Here as well, a vehicle 204 travels on a lane 200 with an adjacent lane 202 on which no objects are located. Thus, as described above, a warning threshold 218 is set that is highly expanded and is situated after the actual departure from the lane. Vehicle 204 now follows the trajectory 220 shown in FIG. 4. At time 222, departure from the lane takes place without a warning being issued. Rather, the driver is given the possibility of correction. A warning is not triggered until warning threshold 224, which is situated very much later, is crossed, because only then does an actual danger exist.

What is claimed is:

1. A method for driver assistance, comprising:
    determining, using a processor of a computer, at least one of a state of a driver of a vehicle and a driving situation;
    adaptively adjusting a warning threshold that represents one of an allowable distance value between the vehicle and a lane edge marking and an allowable time value calculated in reference to a crossing of the lane edge marking, to warn the driver, as a function of at least one of the driver's state and the driving situation, about one of the following conditions: (i) the vehicle has left the lane, and (ii) the vehicle is about to leave the lane; and
    providing at least one of a warning and a lateral guidance intervention if the warning threshold is crossed by the vehicle.

2. The method according to claim 1, wherein if at least one of (a) the driver is attentive and alert and (b) there is an open adjacent lane, the warning threshold is expanded, an expansion of the warning threshold meaning that the warning takes place later than in the case of a narrowed warning threshold.

3. The method according to claim 1, wherein the warning threshold is narrowed if at least one of (a) the driver is sleepy, (b) the driver is inattentive and (c) objects are situated in an adjacent lane.

4. The method according to claim 1, wherein on two sides of the vehicle, warning thresholds are adapted differently, independently of one another.

5. The method according to claim 1, further comprising at least one of (a) switching-off the warning and (b) setting the warning threshold to values that cannot be reached, if no adjacent lane is present.

6. The method according to claim 1, wherein in addition a driving style of the driver is taken into account, an expansion of the warning threshold taking place if an offensive, sport-like driving style is present.

7. A device for driver assistance, comprising:
    a processing unit for at least one of warning a driver and initiating a lateral guidance intervention if at least one warning threshold is crossed, the processing unit determining at least one of a driver's state and a driving situation and adaptively adjusting the warning threshold as a function of at least one of the driver's state and the driving situation, wherein the warning threshold represents one of an allowable distance value between a vehicle and a lane edge marking and an allowable time value calculated in reference to a crossing of the lane edge marking.

8. The method according to claim 1, wherein the driver's state is a dominant factor when both the driver's state and the driving situation are used in adjusting the warning threshold.

9. The method according to claim 1, further comprising:
    forming vectors to describe the at least one of the driver's state and the driving situation; and
    evaluating the vectors to perform the adaptive adjusting of the warning threshold.

10. The method according to claim 2, wherein in response to determining that there is an open adjacent lane, the warning threshold is expanded into the open adjacent lane, so that the driver is warned only after the vehicle has left the lane and entered the open adjacent lane.

* * * * *

UNITED STATES PATENT AND TRADEMARK OFFICE
CERTIFICATE OF CORRECTION

PATENT NO. : 8,354,932 B2
APPLICATION NO. : 11/664573
DATED : January 15, 2013
INVENTOR(S) : Carsten Schmitz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1552 days.

Signed and Sealed this
First Day of September, 2015

Michelle K. Lee
*Director of the United States Patent and Trademark Office*